United States Patent [19]
Takeuchi et al.

[11] Patent Number: 5,394,235
[45] Date of Patent: Feb. 28, 1995

[54] APPARATUS FOR MEASURING DISTORTION POSITION OF OPTICAL FIBER

[75] Inventors: Nobunari Takeuchi; Tekken Lee, both of Tokyo; Kaoru Shimizu; Tsuneo Horiguchi, both of Mito, all of Japan

[73] Assignees: Ando Electric Co., Ltd.; Nippon Telegraph and Telephone Corporation, both of Tokyo, Japan

[21] Appl. No.: 214,136

[22] Filed: Mar. 16, 1994

[30] Foreign Application Priority Data

Mar. 17, 1993 [JP]   Japan .................................. 5-057494

[51] Int. Cl.⁶ .......................................... G01N 21/88
[52] U.S. Cl. .................................................. 356/73.1
[58] Field of Search ...................................... 356/73.1

[56] References Cited
FOREIGN PATENT DOCUMENTS 0348235 12/1989 European Pat. Off. .
2134345 8/1984 United Kingdom .

Primary Examiner—Vincent P. McGraw
Attorney, Agent, or Firm—Finnegan, Henderson Farabow, Garrett & Dunner

[57] ABSTRACT

An apparatus for measuring a distortion position of an optical fiber is disclosed. A light source generates continuous light with frequency $f_0$ and injects the continuous light into a far-end of an optical fiber to be measured. An optical coupler divides the outgoing continuous light from a near-end of the optical fiber. An optical amplifier amplifies output light from the optical coupler. A first optical switch generates a first optical pulse by switching output light from the optical amplifier. An optical frequency shifter generates a second optical pulse having frequency components ($f_0+f_m$) based on the first optical pulse from the first optical switch. A second optical switch injects the second optical pulse into the near-end of the optical fiber. A display displays outgoing continuous light with frequency $f_0$ from the near-end of the optical fiber via the optical coupler and the second optical switch. A timing control circuit controls the operation timing of the first and second optical switches and the optical frequency shifter.

1 Claim, 4 Drawing Sheets

APPARATUS FOR MEASURING DISTORTION POSITION OF OPTICAL FIBER

BACKGROUND OF THE INVENTION

1. Field of the Invention

The present invention relates to apparatuses for measuring a distortion position of an optical fiber, and more particularly, to apparatuses for measuring a distortion position of an optical fiber using an optical frequency shifter capable of forming a Brillouin optical time domain analyzer having Brillouin amplification characteristics using a light source.

2. Background Art

An example of the structure of a conventional apparatus for measuring a distortion position of an optical fiber will be explained with reference to FIG. 5. In FIG. 5, light sources 1A, 1B, a display 7, an optical switch 9A, an optical coupler 9B, and an optical fiber 10, are provided. In FIG. 5, the light source 1A generates continuous light 21 and the light source 1B generates continuous light 22. The continuous light 22 from the light source 1B is converted to an optical pulse 23 by the optical switch 9A. The display 7 has the same structure as a conventional display used in a conventional optical pulse tester. The optical fiber 10 is to be measured. The circuit shown in FIG. 5 forms a Brillouin optical time domain analyzer (hereafter referred to as BOTDA). The BOTDA is disclosed in Japanese Patent Application Laid-Open Publication No. 2-6725.

In FIG. 5, the continuous light 21 from the light source 1A is injected into a far-end 10A of the optical fiber 10. The optical pulse 23 from the optical switch 9A is injected into a near-end 10B of the optical fiber 10 via the optical coupler 9B. The optical pulse 23 progresses toward the far-end 10A in the optical fiber 10 while continuously colliding with the continuous light 21 injected at the far-end 10A in the optical fiber 10. When the frequency difference between the frequency of the continuous light 21 from the light source 1A and that of the continuous light 22 from the light source 1B is equal to Brillouin shift frequency, the continuous light 21 injected at the far-end 10A in the optical fiber 10 progresses toward the near-end 10B while being Brillouin amplified, and thereby the loss characteristics of the optical fiber 10 are included in the continuous light 21 as information. The continuous light 21 from the near-end 10B is supplied to the display 7 via the optical coupler 9B. The loss characteristics of the optical fiber 10 is displayed on the display 7.

In the above conventional apparatus for measuring the distortion position of the optical fiber, since the continuous light 21 and the optical pulse 23 are injected, respectively, in the far-end 10A and the near-end 10B of the optical fiber 10, both of the light sources 1A and 2B are needed. The frequency stability of the light sources 1A and 1B directly influences measurement accuracy of the distortion of the optical fiber 10. Because the Brillouin shift frequency is approximately 500 MHz when the distortion of the optical fiber 10 is 1%, the stability of the relative frequency between the continuous light 21 from the light source 1A and the continuous light 22 from the light source 1B must be less than 5 MHz. However, in the conventional apparatus for measuring the distortion position of the optical fiber, it is not possible for the above stability to be less than 5 MHz.

SUMMARY OF THE INVENTION

In consideration of the above problems, it is an object of the present invention to provide an apparatus for measuring a distortion position of an optical fiber capable, of stabilizing the frequency of continuous light and an optical pulse within measurement time in one measurement.

To satisfy this object, the present invention provides an apparatus for measuring a distortion position of an optical fiber comprising: a light source for generating continuous light with frequency $f_0$, which is connected to a far-end of an optical fiber to be measured; an optical coupler for dividing outgoing continuous light from a near-end of the optical fiber; an optical amplifier for amplifying the continuous light divided by the optical coupler; a first optical switch for generating a first optical pulse by switching the output continuous light from the optical amplifier; an optical frequency shifter for generating a second optical pulse having frequency components $(f_0+f_m)$ based on the first optical pulse; a second optical switch for injecting the second optical pulse into the near-end of the optical fiber; a display for displaying the outgoing continuous light with frequency $f_0$ from the near-end of the optical fiber via the optical coupler and the second optical switch; and a timing control circuit for controlling the operation timing of the first and second switches and the optical frequency shifter.

According to the present invention, one improvement is that a measurement system corresponding to BOTDA using two light sources making use of Brillouin amplification characteristics can be formed by a measurement system using continuous light from only a light source by using an optical frequency shifter. Accordingly, the continuous pulse and the optical pulse become stable within measurement time in one measurement.

DETAILED DESCRIPTION OF THE PREFERRED EMBODIMENT

Figure 1:
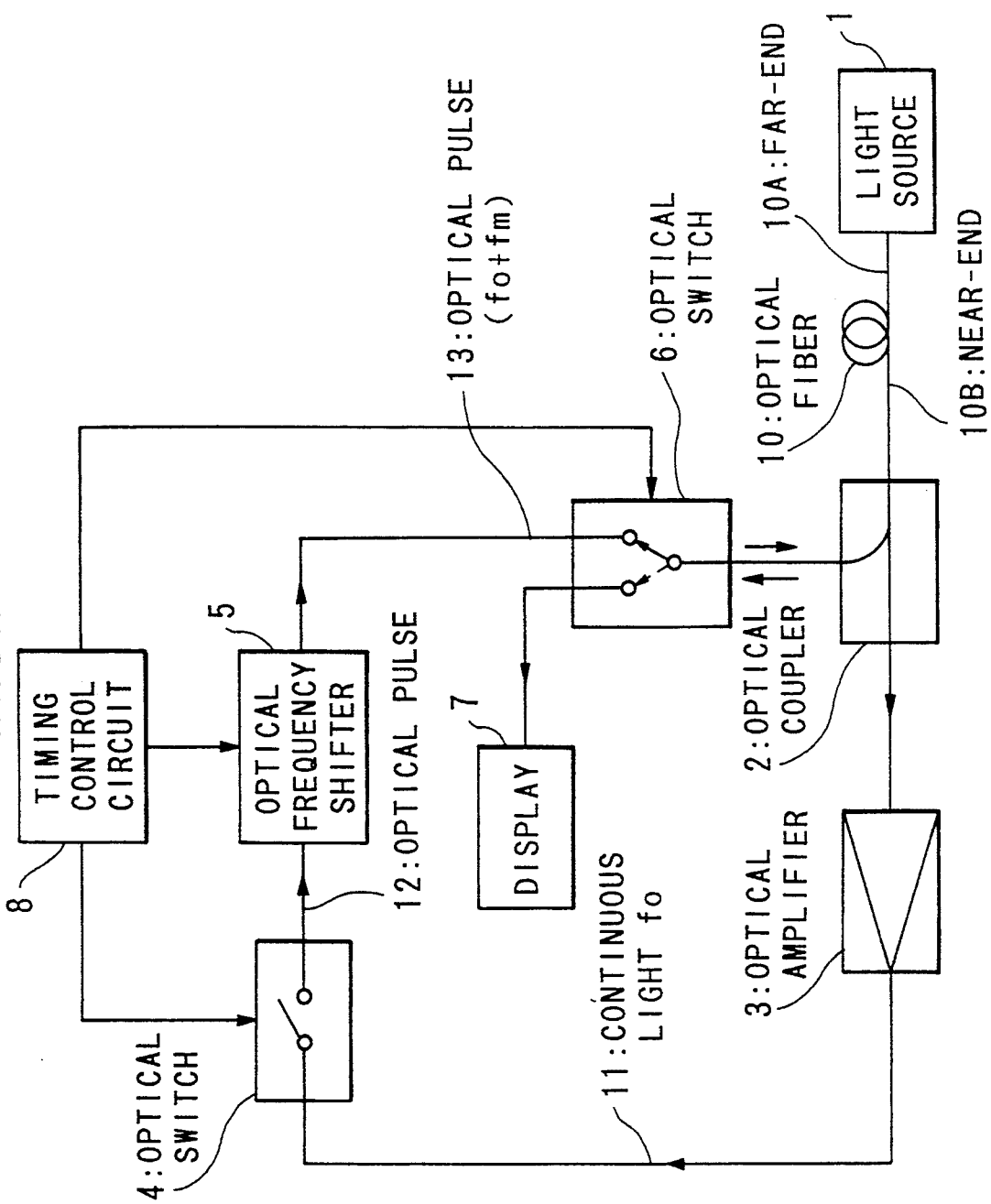
FIG. 1 shows a block diagram of the structure of an apparatus for measuring a distortion position of an optical fiber based on the preferred embodiment of the present invention.
Figure 5:
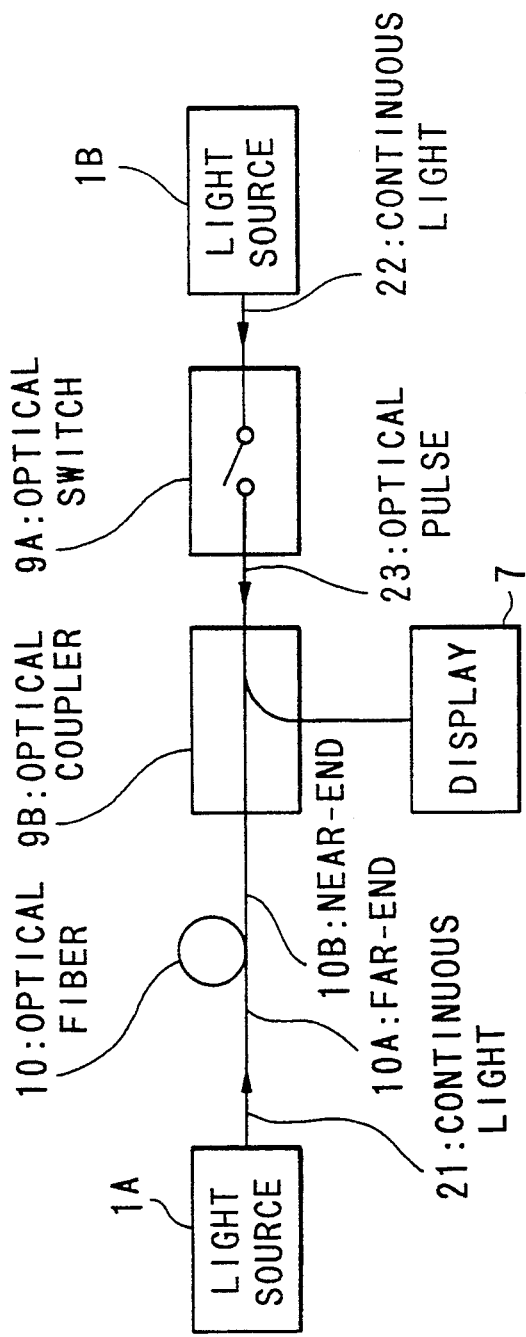
FIG. 5 shows an example of the structure of a conventional apparatus for measuring a distortion position of an optical fiber.

Hereinafter, a preferred embodiment of the present invention will be explained with reference to the figures. FIG. 1 shows a block diagram of the structure of an apparatus for measuring a distortion position of an optical fiber based on the preferred embodiment of the present invention. In FIG. 1, components which correspond to components in the conventional apparatus for measuring the distortion position of the optical fiber shown in FIG. 5 will retain the original identifying numeral. In FIG. 1, a light source 1, an optical coupler 2, an optical amplifier 3, optical switches 4 and 6, an optical frequency shifter 5, a display 7, and a timing control circuit 8 are provided. In FIG. 1, the light source 1 generates continuous light 11 with wavelength $f_0$. In FIG. 1, the continuous light 11 from the light source 1 is injected into a far-end 10A of the optical fiber 10. The continuous light 11 is injected via the optical fiber 10 into the optical coupler 2 connected to a near-end 10B of the optical fiber 10. The continuous light 11 divided by the optical coupler 2 is amplified in the optical amplifier 3. The continuous light 11 amplified by the optical amplifier 3 is converted into an optical pulse 12 in the optical switch 4.

The optical pulse 12 is converted into an optical pulse 13 having frequency components with wavelength $(f_0+f_m)$ in the optical frequency shifter 5. The structure and the operation of the optical frequency shifter 5 will be explained with reference to FIG. 2 later. The optical pulse 13 from the optical frequency shifter 5 is injected into the near-end 10B of the optical fiber 10 via the optical switch 6 and the optical coupler 2. When the optical pulse 13 is injected into the near-end 10B of the optical fiber 10, the optical pulse 13 progresses toward the far-end 10A in the optical fiber 10 while continuously colliding with the continuous light 11 injected at the far-end 10A in the optical fiber 10. When the frequency $f_m$ is equal to the Brillouin shift frequency of the optical fiber 10, the continuous light 11 injected at the far-end 10A in the optical fiber 10 progresses toward the near-end 10B while being Brillouin amplified, and thereby the loss characteristics of the optical fiber 10 are included in the continuous light 11 as information. The continuous light 11 from the near-end 10B is supplied to the display 7 via the optical coupler 2 and the optical switch 6. The loss characteristics of the optical fiber 10 is displayed on the display 7. The above-mentioned continuous light and optical pulse injection and display operation of the apparatus for measuring the distortion position of the optical fiber is the same as a conventional BOTDA having Brillouin amplification characteristics.

Figure 2:
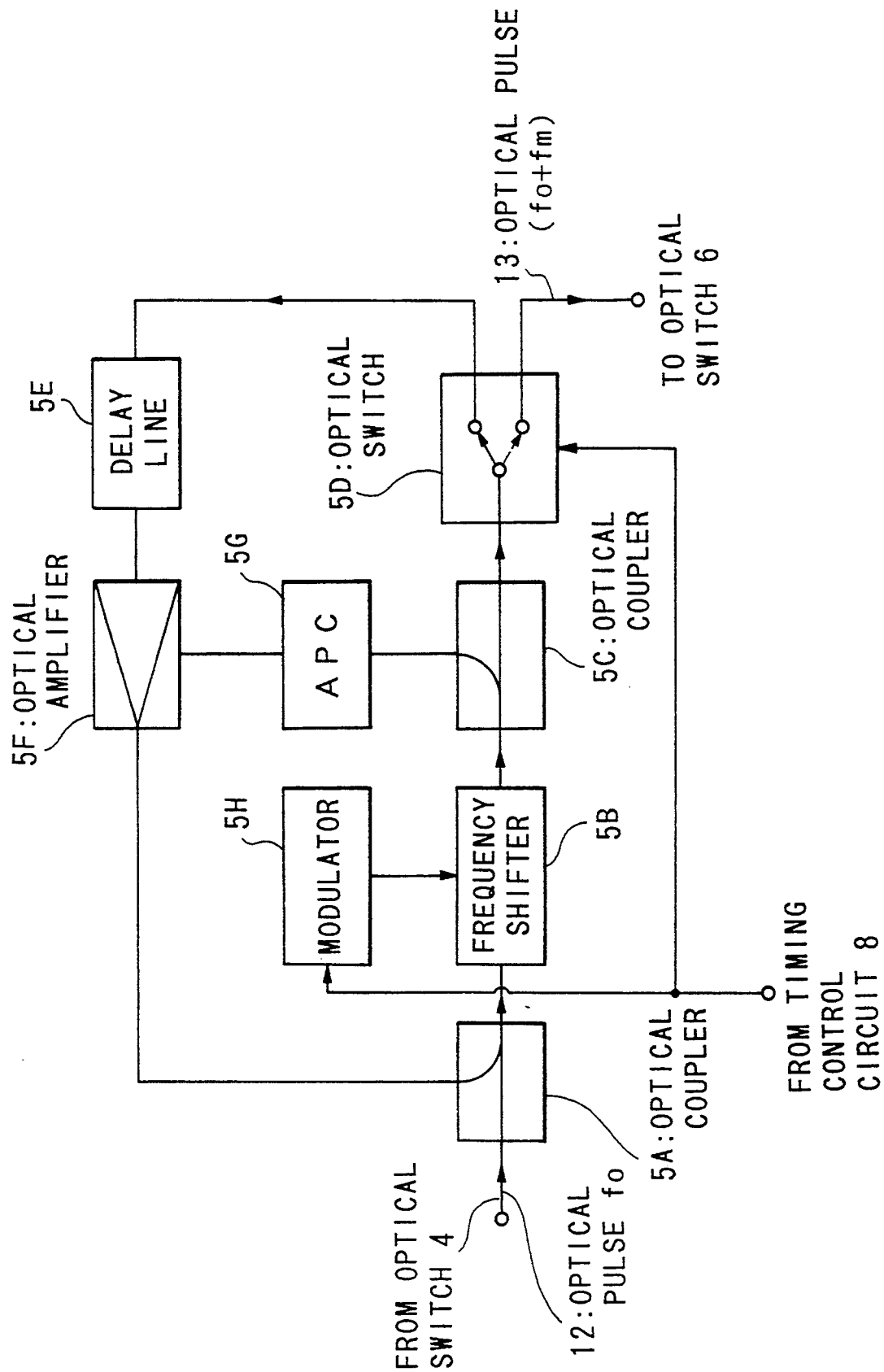
FIG. 2 shows an example of the structure of an optical frequency shifter 5 shown in FIG. 1.

Next, the structure of the optical frequency shifter 5 will be explained with reference to FIG. 2. In FIG. 2, optical couplers 5A and 5C, a frequency shifter 5B, an optical switch 5D, a delay line 5E, an optical amplifier 5F, an automatic phase controller (hereafter referred to as APC) 5G, and a modulator 5H are provided. The structure of the optical switch 5D is the same as the optical switches 4 and 6 shown in FIG. 1 and for example, is an optical switch operating with 1 μs. The delay line 5E delays an input light with time Δt.

The optical pulse with wavelength $f_0$ from the optical switch 4 is converted into the optical pulse 13 having frequency components with wavelength $(f_0+f_m)$ in a loop circuit formed by the optical couplers 5A and 5C, the frequency shifter 5B, the optical switch 5D, the delay line 5E, and the optical amplifier 5F. The frequency $f_m$ is defined by the product of the number n, indicating how many times the optical pulse 12 passes through the frequency shifter 5B, and the shift frequency Δf of the frequency shifter 5B. When the optical pulse 12 circulates in the loop circuit n times, the optical pulse 13 having frequency components with wavelength $(f_0+f_m)$ is output from the loop circuit by switching the optical switch 5D and is supplied to the optical switch 6. The optical frequency shifter is disclosed in B-773, in the fourth volume of the collection of lectures from the meeting of the Japanese Electronic Information Communication Congress in the fall of 1992.

Figure 3:
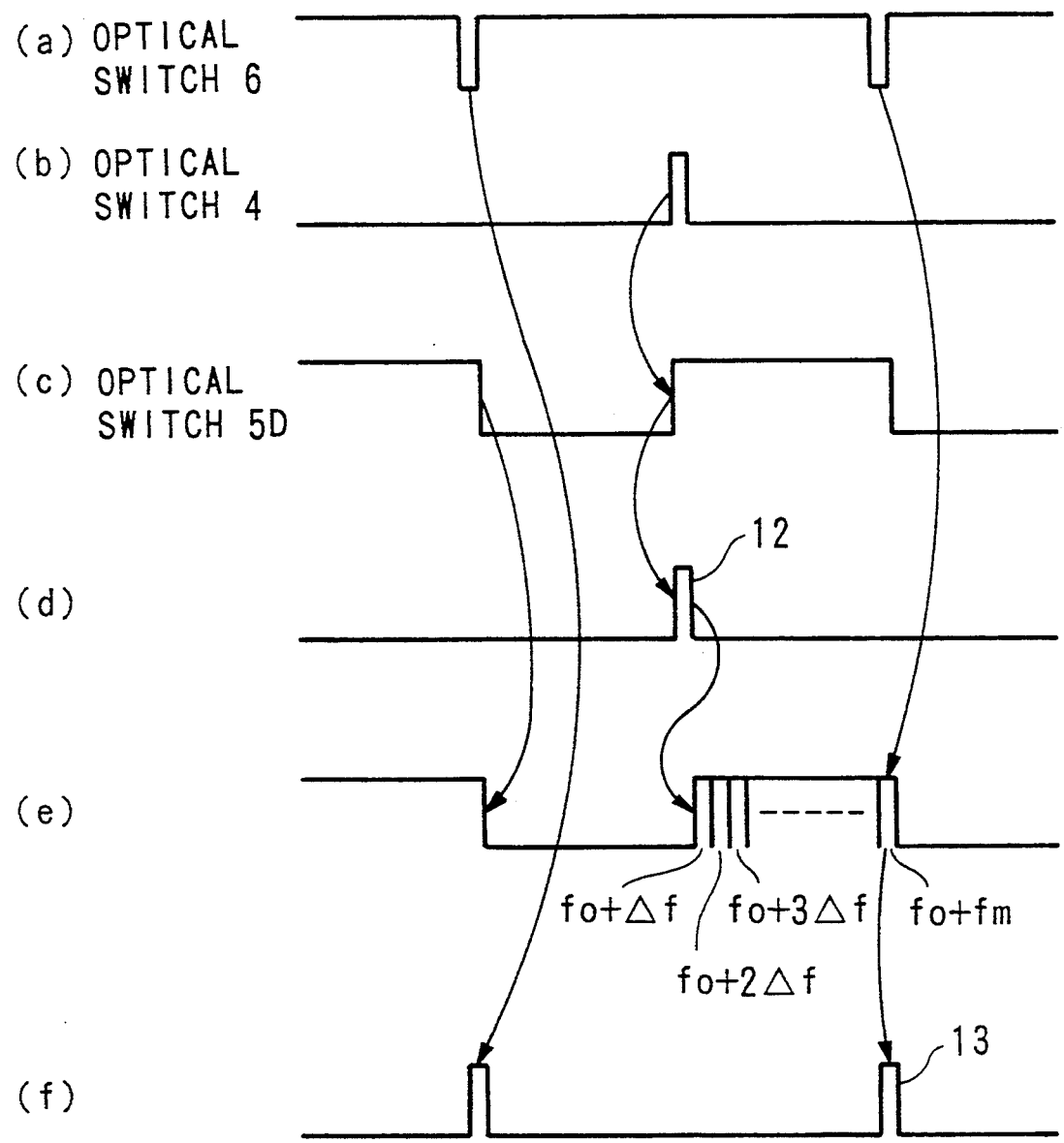
FIG. 3 is a timing chart illustrating the input pulses to and the output pulses from each portion of the apparatus for measuring the distortion position of the optical fiber shown in FIG. 1.

Next, the operation timing of the apparatus shown in FIG. 1 will be explained with reference to FIG. 3. FIG. 3(a) shows an example of the waveform of a control pulse applied to the optical switch 6. FIG. 3(b) shows an example of the waveform of a control pulse applied to the optical switch 4. FIG. 3(c) shows an example of the waveform of a control pulse applied to the optical switch 5D in the optical frequency shifter 5. FIG. 3(d) shows an example of the waveform of an optical pulse 12. FIG. 3(e) shows an example of the waveform of a pulse generated in the optical frequency shifter 5. FIG. 3(f) shows an example of the waveform of an optical pulse 13.

When the optical switch 4 turns on at the timing shown in FIG. 3(b), the optical switch 5D turns on as shown in FIG. 3(c), thereby the optical pulse 12 is generated after the required time as shown in FIG. 3(d). The optical pulse 12 circulates in the loop circuit formed in the optical frequency shifter 5, with the result that frequency components with wavelength $(f_0+\Delta f)$, $(f_0+2\Delta f)$, $(f_0+3\Delta f)$, and the like are generated as shown in FIG. 3(e). Next, when the frequency components with wavelength $(f_0+f_m)$ are generated, the optical pulse 13 having frequency components with wavelength $(f_0+f_m)$ shown in FIG. 3(f) is output from the loop circuit at the timing of the optical switch 6 shown in FIG. 3(a) by turning off the optical switch 5D at the timing shown in FIG. 3(c).

For example, when the wavelength λ of the optical pulse 12 is 1.55 μm, the Brillouin frequency shift corresponds to approximately 10.9 GHz. An acousto-optical switch is used as the frequency shifter 5B, and the modulator 5H controlling the driving frequency of the frequency shifter 5B controls the magnitude of the optical frequency shift of the frequency shifter 5B. The control range of the shifted optical frequency is, for example, 115 through 125 MHz.

In the case when it is desired to measure a distortion ratio of the optical fiber 10 of less than 3%, since the relative frequency difference between the continuous light 11 and the optical pulse 13 needs to be 10.9 GHz±1 GHz, this frequency difference can be made 10.9 GHz±1 GHz by controlling the number n, indicating how many times the optical pulse 12 passes through the frequency shifter 5B, and the frequency for driving the frequency shifter 5B. For example, when the optical pulse 12 is wished to shift at 9.9 GHz, the number n may be set 83 and the driving frequency may be set 119.278 MHz. Therefore, the frequency of the optical pulse 13 becomes higher at 9.9 GHz than the continuous light 11.

Figure 4:
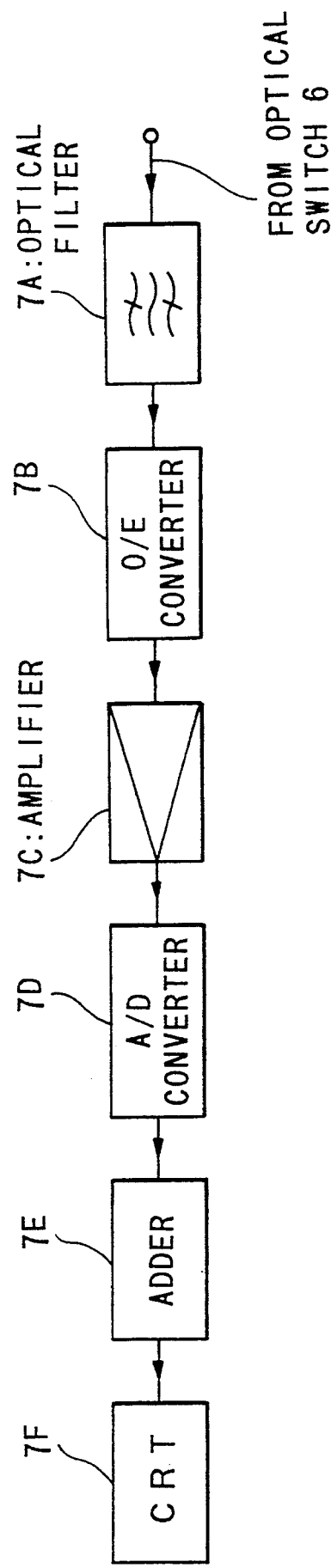
FIG. 4 shows an example of the structure of a display 7 shown in FIG. 1.

Next, the structure of the display 7 will be explained with reference to FIG. 4. In FIG. 4, an optical filter 7A, an optical to electronic converter (hereafter referred to as O/E converter) 7B, an amplifier 7C, an analog to digital converter (hereafter referred to as A/D converter) 7D, an adder 7E, and a cathode ray tube display (hereafter referred to as CRT display) 7F are provided. The optical filter 7A eliminates the frequency components with wavelength $(f_0+f_m)$ and delivers only the frequency components $f_0$ to the O/E converter 7B. The frequency components $f_0$ is displayed on the CRT display 7F by the operation of the O/E converter 7B, the amplifier 7C, the A/D converter 7D, and the adder 7E. The structure of the display 7 is the same as the conventional display used in the conventional optical pulse tester.

What is claimed is:

1. An apparatus for measuring a distortion position of an optical fiber comprising:

a light source for generating continuous light with frequency $f_0$, which is connected to a far-end of an optical fiber to be measured;

an optical coupler for dividing outgoing continuous light from a near-end of said optical fiber;

an optical amplifier for amplifying the continuous light divided by said optical coupler;

a first optical switch for generating a first optical pulse by switching the output continuous light from said optical amplifier;

an optical frequency shifter for generating a second optical pulse having frequency components ($f_0+f_m$) based on said first optical pulse;

a second optical switch for injecting said second optical pulse into said near-end of said optical fiber;

a display for displaying the outgoing continuous light with frequency $f_0$ from said near-end of said optical fiber via said optical coupler and said second optical switch; and a timing control circuit for controlling the operation timing of said first and second switches and said optical frequency shifter.

* * * * *